(12) United States Patent
Spaude

(10) Patent No.: US 7,803,077 B1
(45) Date of Patent: Sep. 28, 2010

(54) CONSTANT TORQUE INPUT INFINITELY VARIABLE AUTOMATIC TRANSMISSION

(76) Inventor: Robert W. Spaude, 8545 W. Beloit Rd., Apt. 2012, West Allis, WI (US) 53227

( * ) Notice: Subject to any disclaimer, the term of this patent is extended or adjusted under 35 U.S.C. 154(b) by 0 days.

(21) Appl. No.: 12/390,530

(22) Filed: Feb. 23, 2009

(51) Int. Cl.
*F16H 9/00* (2006.01)
*F16H 59/00* (2006.01)
*F16H 61/00* (2006.01)
*F16H 63/00* (2006.01)

(52) U.S. Cl. ........................................................ 474/83
(58) Field of Classification Search ............... 474/51, 474/53, 54, 83, 212; 280/236; 318/11
See application file for complete search history.

(56) References Cited

U.S. PATENT DOCUMENTS

| | | | | | |
|---|---|---|---|---|---|
| 390,216 | A | * | 10/1888 | Evans | 192/104 R |
| 657,516 | A | * | 9/1900 | Coleman | 318/11 |
| 691,789 | A | * | 1/1902 | Mann | 475/182 |
| 944,585 | A | * | 12/1909 | Watson | 474/83 |
| 1,012,983 | A | * | 12/1911 | Caldwell | 474/54 |
| 1,048,220 | A | * | 12/1912 | Sleeper | 74/325 |
| 1,111,466 | A | * | 9/1914 | Jackson | 474/84 |
| 2,027,710 | A | * | 1/1936 | Stewart | 475/182 |
| 2,344,341 | A | * | 3/1944 | Coen | 474/53 |
| 2,432,442 | A | * | 12/1947 | Pourtier | 476/53 |
| 2,454,991 | A | * | 11/1948 | Cooke | 474/29 |
| 2,583,790 | A | * | 1/1952 | Mikina | 476/4 |
| 2,622,446 | A | * | 12/1952 | Shaw | 474/14 |
| 2,626,002 | A | * | 1/1953 | Wubbe | 180/343 |
| 2,705,892 | A | * | 4/1955 | Yeager | 474/70 |
| 2,737,820 | A | * | 3/1956 | Collar | 476/30 |
| 2,801,547 | A | * | 8/1957 | Guibert | 474/83 |
| 2,864,263 | A | * | 12/1958 | Rawson | 474/240 |
| 3,043,149 | A | * | 7/1962 | Davin et al. | 476/53 |
| 3,165,002 | A | * | 1/1965 | Hatch | 474/77 |
| 3,285,083 | A | * | 11/1966 | Singer | 476/8 |
| 3,333,479 | A | * | 8/1967 | Shields | 476/51 |
| 3,364,775 | A | * | 1/1968 | Sack | 74/425.5 |
| 3,873,128 | A | * | 3/1975 | Dunder et al. | 280/236 |
| 3,894,439 | A | * | 7/1975 | Borello | 474/83 |
| 3,906,809 | A | * | 9/1975 | Erickson | 474/83 |
| 4,210,032 | A | * | 7/1980 | Lampert | 476/1 |
| 4,295,383 | A | * | 10/1981 | Frost | 474/83 |
| 4,295,836 | A | * | 10/1981 | Kumm | 474/51 |
| 4,504,248 | A | * | 3/1985 | Hollinger | 474/24 |

(Continued)

*Primary Examiner*—Michael R Mansen
*Assistant Examiner*—Henry Liu
(74) *Attorney, Agent, or Firm*—Nicholas A. Kees; Godfrey & Kahn, S.C.

(57) ABSTRACT

A constant torque input infinitely variable automatic transmission preferably includes a transmission base, a first cone member, a second cone member, a cone drive member and a biasing member. The transmission base preferably includes a drive base, a first cone yoke and a second cone yoke. The first cone yoke is pivotally retained by the drive base and the first cone member is rotatably retained by the first cone yoke. The second cone yoke extends from the drive base and the second cone yoke rotatably retains the second cone member. A small diameter end of the first cone member is positioned adjacent to a large diameter end of the second cone member. The bias member causes an axis of the first cone member to move toward an axis of the second cone member. The cone drive member is received by an outer perimeter of the first and second cone members.

6 Claims, 4 Drawing Sheets

U.S. PATENT DOCUMENTS

| | | | |
|---|---|---|---|
| 4,680,985 A * | 7/1987 | Troester | 475/3 |
| 4,842,569 A * | 6/1989 | Orr | 474/83 |
| 4,875,389 A * | 10/1989 | Fragnito | 475/212 |
| 4,882,948 A * | 11/1989 | Byrnes, Jr. | 475/115 |
| 5,061,224 A * | 10/1991 | Stuhler | 474/84 |
| 5,062,626 A * | 11/1991 | Dalebout et al. | 482/1 |
| 5,069,078 A * | 12/1991 | Fairbanks | 74/216.3 |
| 5,199,929 A * | 4/1993 | Stites | 474/54 |
| 5,226,854 A * | 7/1993 | Hauser | 474/83 |
| 5,601,509 A * | 2/1997 | Munoz | 476/53 |
| 5,641,320 A * | 6/1997 | Ketcham | 476/55 |
| 5,660,077 A * | 8/1997 | Nekola | 74/416 |
| 5,681,235 A * | 10/1997 | Ketcham | 476/1 |
| 5,984,820 A * | 11/1999 | Wedeniwski | 475/193 |
| 6,467,374 B1 * | 10/2002 | Kaplun | 74/640 |
| 6,558,285 B1 * | 5/2003 | Sieber | 475/193 |
| 6,626,780 B2 * | 9/2003 | Fragnito | 474/54 |
| 6,656,070 B2 * | 12/2003 | Tay | 474/83 |
| 6,752,740 B2 * | 6/2004 | Semmes | 476/72 |
| 6,908,406 B2 * | 6/2005 | Overbay et al. | 474/83 |
| 6,955,624 B2 * | 10/2005 | Brass | 475/193 |
| 7,147,587 B2 * | 12/2006 | Kaplun | 476/55 |
| 2002/0091026 A1 * | 7/2002 | Tay | 474/53 |
| 2003/0050139 A1 * | 3/2003 | Anderson | 474/83 |
| 2004/0092360 A1 * | 5/2004 | Semmes | 476/72 |
| 2004/0127325 A1 * | 7/2004 | Kaplun | 476/55 |

* cited by examiner

CONSTANT TORQUE INPUT INFINITELY VARIABLE AUTOMATIC TRANSMISSION

BACKGROUND OF THE INVENTION

1. Field of the Invention

The present invention relates generally to transmissions and more specifically to a constant torque input infinitely variable automatic transmission, which changes a drive ratio for being driven by a constant torque input.

2. Discussion of the Prior Art

It appears that the prior art does disclose a purely mechanical transmission that automatically shifts a drive ratio to maintain a constant input torque. An automatically shifting transmission is desirable for cyclists, who do not want to be troubled with the need for shifting, yet want to pedal at a constant torque. However, there are other applications besides bicycles, where a constant torque input infinitely variable automatic transmission could be utilized.

U.S. Pat. No. 3,873,128 to Dunder et al. discloses a drive transmission for a bicycle or the like. The Dunder et al. patent includes a housing having a pair of spaced right circular cones oppositely mounted and journaled for rotation within the housing. Means is provided for transmitting rotation of one of the cones to the other. U.S. Pat. No. 3,906,809 to Erickson discloses a transmission having an infinitely variable drive ratio. The Erickson patent includes a variable ratio transmission having a pair of opposed oriented adjacent splined cone shaped members interconnected by a selectively positionable positive gripping drive chain.

Accordingly, there is a clearly felt need in the art for a constant torque input infinitely variable automatic transmission, which changes a drive ratio for being driven by a constant torque input and is purely a mechanical design.

SUMMARY OF THE INVENTION

The present invention provides a constant torque input infinitely variable automatic transmission, which automatically changes a drive ratio for being driven by a constant torque input. The constant torque input infinitely variable automatic transmission (constant torque automatic transmission) preferably includes a transmission base, a first cone member, a second cone member, a cone drive member and a biasing member. The transmission base preferably includes a drive base, a first cone yoke and a second cone yoke. The first cone yoke is pivotally retained by the drive base and the first cone member is rotatably retained by the first cone yoke. The second cone yoke extends from the drive base and the second cone yoke rotatably retains the second cone member. The first and second cone members are disposed, such that the small diameter end of the first cone member is adjacent to the large diameter end of the second cone member.

A first drive member extends from one end of the first cone member and a second drive member extends from one end of the second cone member. The drive member could be a gear, a sprocket or any other suitable type of drive member. The bias member causes an axis of the first cone member to move toward an axis of the second cone member. The bias member is preferably an extension spring, but other types of bias members may also be used. The cone drive member is sized to be received by an outer perimeter of the first and second cone members. The cone drive member is preferably a belt, but other types of drive members may also be used.

The most appropriate application for the constant torque automatic transmission is a bicycle. The first drive member is driven by a crank of a bicycle through a first chain. The second drive member drives a rear wheel of the bicycle through a second chain. In use, as a bicyclist rides up a hill, the constant torque automatic transmission will automatically shift to a lower speed ratio then is required on a horizontal surface. The cone drive member will automatically travel along an axis of the first and second cone members from medium drive ratio to a lower drive ratio. The bicyclist will go up the hill at a slower speed than on the horizontal surface. As the bicyclist goes down the hill, the constant torque automatic transmission will automatically shift to a higher drive ratio then is required to go up the hill. The cone drive member will automatically travel along an axis of the first and second cone members from a low drive ratio past a medium drive ratio to a high drive ratio.

Accordingly, it is an object of the present invention to provide a constant torque input infinitely variable automatic transmission, which changes a drive ratio for being driven by a constant torque input and is purely an automatic mechanical design.

These and additional objects, advantages, features and benefits of the present invention will become apparent from the following specification.

DETAILED DESCRIPTION OF THE PREFERRED EMBODIMENTS

Figure 1:
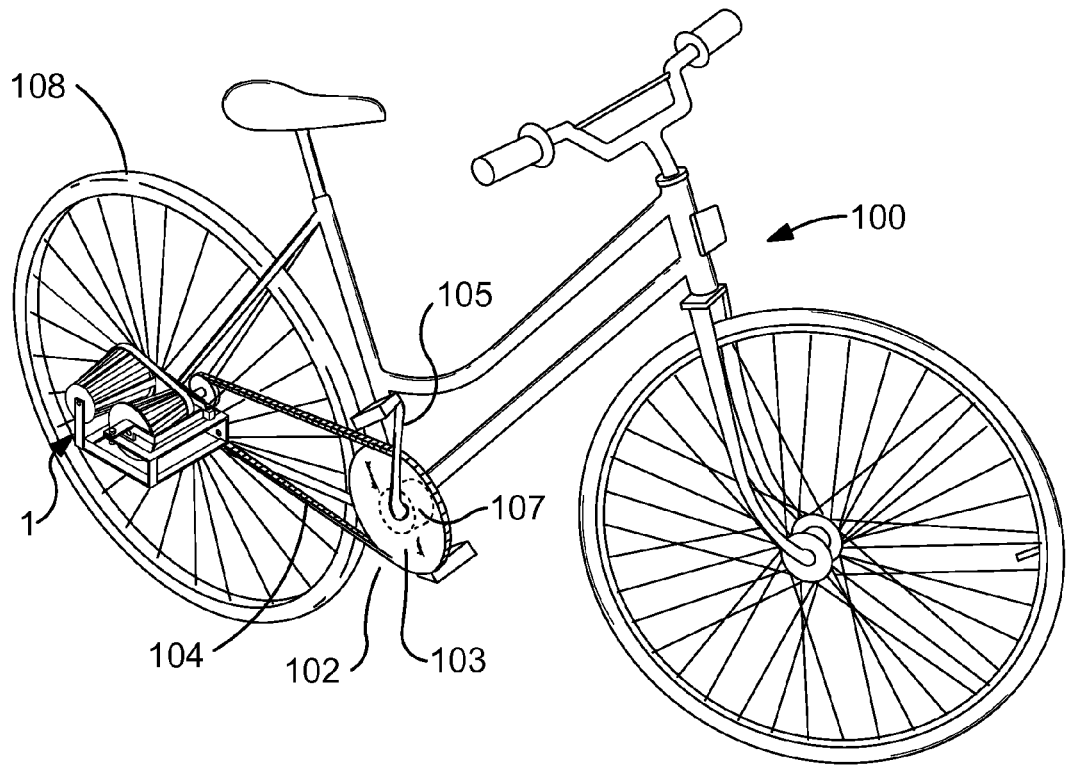
FIG. 1 is a perspective view of a bicycle with a constant torque automatic transmission in accordance with the present invention.
Figure 2:
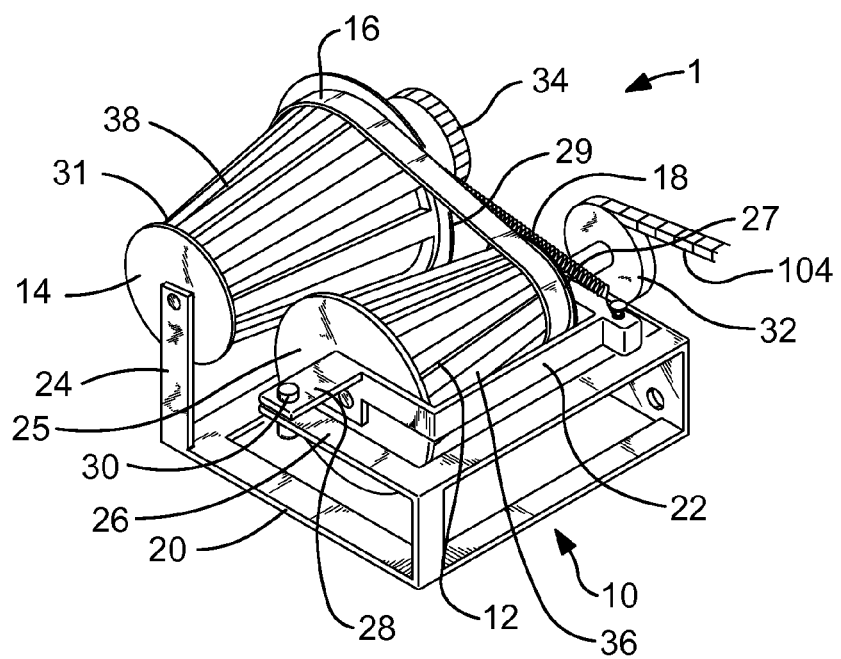
FIG. 2 is a perspective view of a constant torque automatic transmission in accordance with the present invention.
Figure 3:
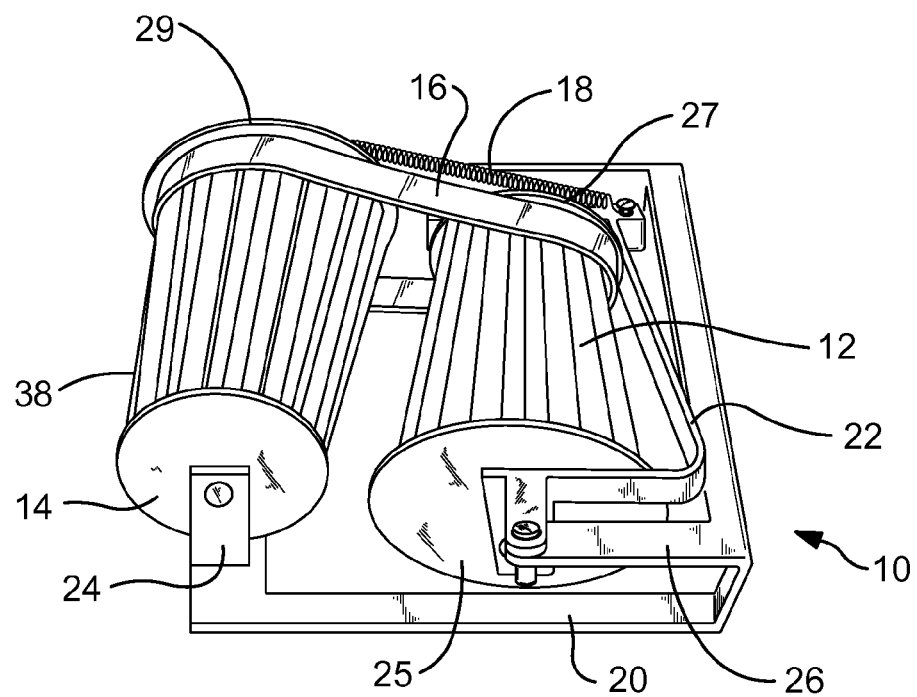
FIG. 3 is a top perspective view of a constant torque automatic transmission in accordance with the present invention.
Figure 4:
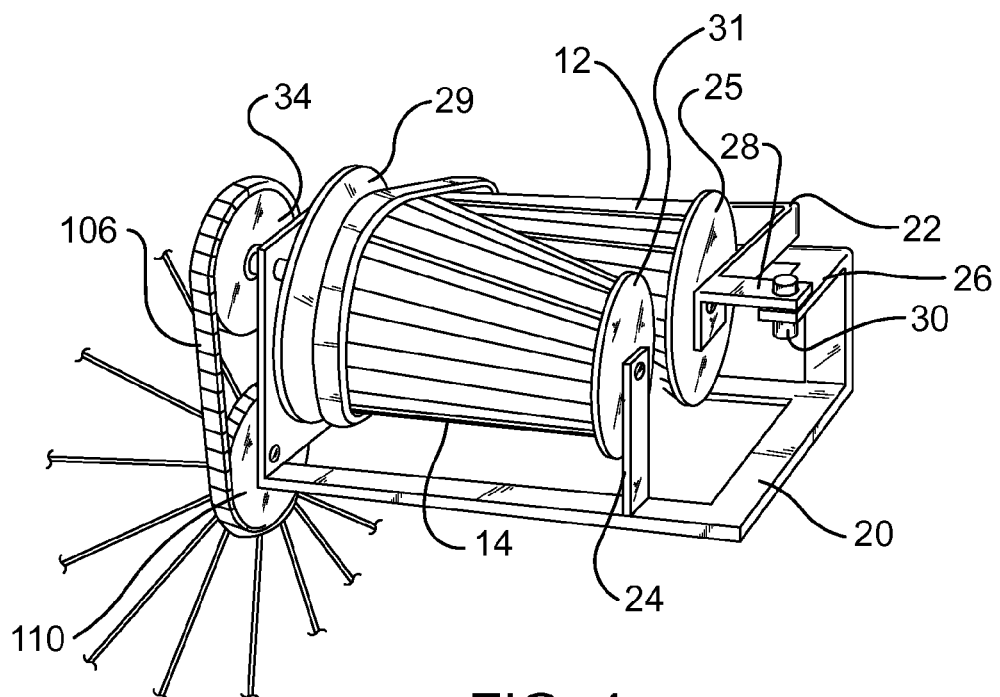
FIG. 4 is a rear perspective view of a constant torque automatic transmission in accordance with the present invention.

With reference now to the drawings, and particularly to FIG. 1, there is shown a perspective view of a bicycle 100 with a constant torque automatic transmission 1. With reference to FIGS. 2-4, the constant torque automatic transmission preferably includes a transmission base 10, a first cone member 12, a second cone member 14, a cone drive member 16 and a biasing member 18. The transmission base 10 preferably includes a drive base 20, a first cone yoke 22 and a second cone yoke 24. A base pivot arm 26 extends from the drive base 20. The first cone yoke 22 rotatably retains the first cone member 12. A yoke pivot arm 28 extends from the first cone yoke 22. The first cone yoke 22 is pivotally secured to the drive base 20 with a pivot pin 30 inserted through the base pivot arm 26 and the yoke pivot arm 28.

The first and second cone members are disposed, such that the small diameter end of the first cone member 12 is adjacent to the large diameter end of the second cone member 14. A first large flange 25 is preferably formed on the large diameter end of the first cone member 12 and a first small flange 27 is formed on the small end of the first cone member 12. A second large flange 29 is preferably formed on the large of the second cone member 14 and a second small flange 31 is formed on the small end of the second cone member 14. The first and second flanges prevent the cone drive member 16 from running-off an end of the first and second cone members.

A first drive member 32 extends from one end of the first cone member 12 and a second drive member 34 extends from one end of the second cone member 14. The first and second drive members could be gears, sprockets or any other suitable type of drive member. One end of the biasing member 18 is preferably attached to the first cone yoke 22 and the other end of the biasing member 18 is attached to the drive base 20 or the second cone yoke 24. The bias member 18 causes an axis of the first cone member 12 to move toward an axis of the second cone member 14. The bias member is preferably an extension spring, but other types of bias members may also be used.

A plurality of first lengthwise projections 36 are preferably formed on an outer perimeter of the first cone member 12 and a plurality of second lengthwise projections 38 are preferably formed on an outer perimeter of the second cone member 14. However, other drive surfaces may also be formed on the first and second cone members. The cone drive member 16 is sized to be received by an outer perimeter of the first and second cone members. The cone drive member 16 is preferably a belt, but other types of drive members may also be used.

Figure 5:
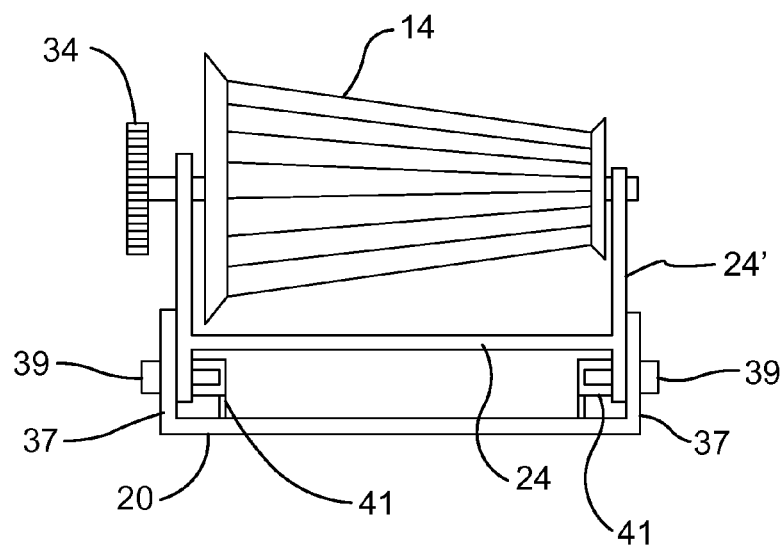
FIG. 5 is a rear view of a second cone member of a constant torque automatic transmission in accordance with the present invention.
Figure 6:
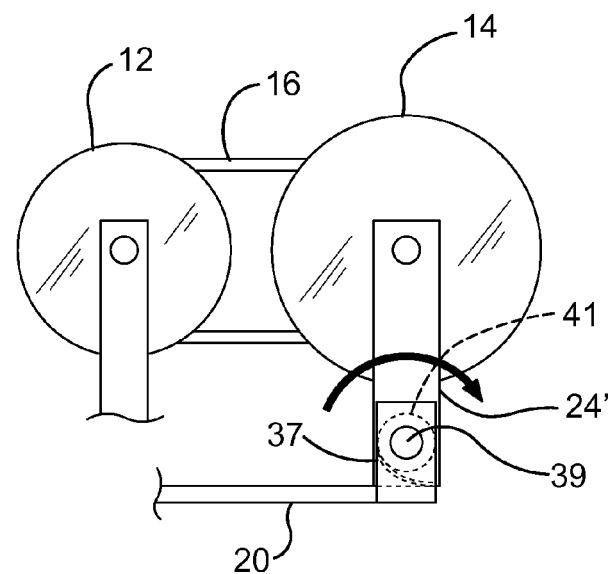
FIG. 6 is a end view of first and second cone members of a constant torque automatic transmission in accordance with the present invention.

With reference to FIGS. 5-6, if a chain is used instead of a belt for the cone drive member 16, a second cone yoke 24' must pivot away from the first cone yoke 22. A pair of pivot stand-offs 37 extend from the drive base 20. A pair of pivot pins pivotally engage each end of the second cone yoke 24'. Preferably, a pair of torsion springs 41 cause the second cone member 14 to pivot away from the first cone yoke 12. However, other biasing arrangements may also be used. One end of the torsion spring 41 contacts a top of the drive base 20 and the other end is inserted into the second cone yoke 24'. The use of torsion springs are well known in the art and need not be explained in further detail. The second cone member 14 must tilt away from the first cone member 12 to take-up any slack in the chain.

Figure 7:
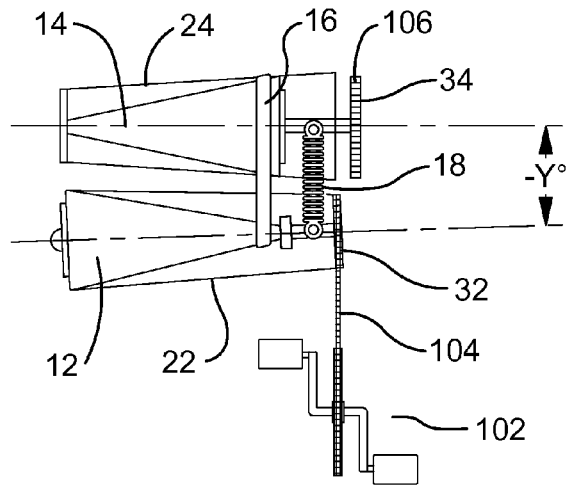
FIG. 7 is a schematic diagram of a below average force being applied to a first cone member of a constant torque automatic transmission in accordance with the present invention.
Figure 8:
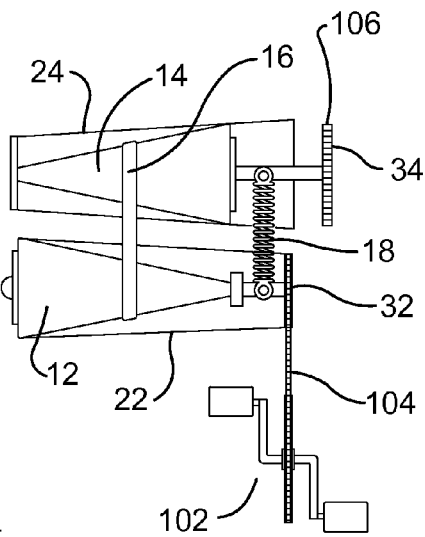
FIG. 8 is a schematic diagram of an average force being applied to a first cone member of constant torque automatic transmission in accordance with the present invention.
Figure 9:
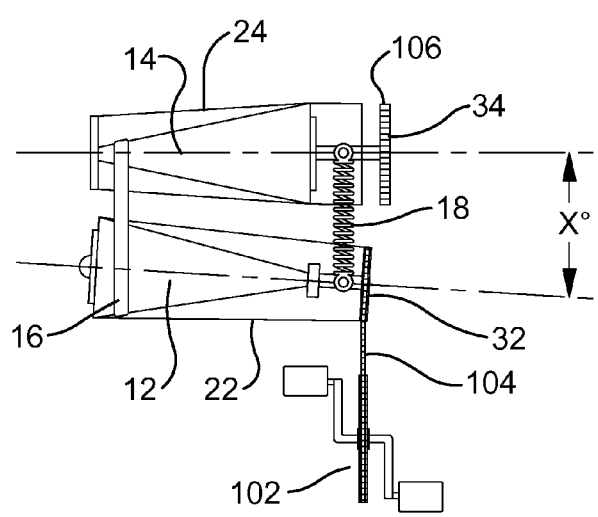
FIG. 9 is a schematic diagram of an above average force being applied to a first cone member of a constant torque automatic transmission in accordance with the present invention.

The most appropriate application for the constant torque automatic transmission 1 is a bicycle. With reference to FIGS. 7-9, the first drive member 32 is driven by a crank 102 of the bicycle 100 through a first chain 104 or belt. The crank 102 includes a crank drive member 103 and a crank arm 105. A one way clutch 107 is retained in a crank hanger of the bicycle 100. The one way clutch 107 allows the crank drive member 103 to rotate without rotation of the crank arm 105. The one way clutch 107 allows a cyclist to pedal the bicycle 100 or let the bicycle 100 coast. When the bicycle 100 is moving, the constant torque automatic transmission 1 is in rotation and the cone drive member 16 is able shift position to change the drive ratio between the first and second cone members, according to torque requirements provided by the cyclist.

The second drive member 34 directly drives a rear drive member 110 of a rear wheel 108 of the bicycle 100 through a second chain 106 or belt. With reference to FIG. 7, as a bicyclist rides up a hill, the constant torque automatic transmission 1 will automatically shift to a lower speed ratio then is required on a horizontal surface. The cone drive member 16 will automatically travel along an axis of the first and second cone members from a medium drive ratio to a lower drive ratio. The bicyclist will go up the hill at a slower speed than on the horizontal surface. An axis of the first cone member 12 tilts toward an axis of the second cone member 14 to create a negative angle Y.

With reference to FIG. 8, as the bicyclist travels along a horizontal surface at a top of the hill, the constant torque automatic transmission 1 will automatically shift from a lower speed ratio to a medium speed ratio. The cone drive member 16 will automatically travel along an axis of the first and second cone members from the low drive ratio to a medium drive ratio. The axis of the first cone member 12 will be substantially parallel to the axis of the second cone member 14. With reference to FIG. 9, as the bicyclist goes down the hill, the constant torque automatic transmission 1 will automatically shift to a higher drive ratio from the medium drive ratio. The cone drive member 16 will automatically travel along an axis of the first and second cone members from the medium drive ratio to the high drive ratio. An axis of the first cone member 12 tilts away from an axis of the second cone member 14 to create a positive angle X.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A constant torque automatic transmission for a bicycle comprising:

a crank driving a crank driving member, a drive base;

a first cone member having a small diameter end and a large diameter end, said first cone member being rotatably retained to rotate about the cone axis by a first cone yoke, said first cone yoke being pivotally retained by said drive base at a first axial end of said first cone member on a pivot axis, said pivot axis being different from the cone axis, rotation of said crank drives said crank driving member drivingly engaged to a second axial end of said first cone member to pivot said first cone member about the pivot axis and to rotate the first cone member about the cone axis;

a second cone member having a small diameter end and a large diameter end, said second cone member being rotatably retained by said drive base, said small diameter end of said first cone member being positioned adjacent said large diameter end of said second cone member, a rear wheel of the bicycle is driven rotated by said second cone member;

a biasing member causing a first axis of said first cone member to move toward a second axis of said second cone member; and a cone drive member being sized to be received by an outer perimeter of said first cone and second cone members, said first cone member causes rotation of said second cone member through said cone drive member, a drive ratio of said first and second cone members as determined by a position of said cone drive member is instantaneously adjusted by pivoting of said first cone member about the pivot axis according to force applied to the crank;

wherein the axes of said first and second cone members are parallel when a predetermined force is applied to said crank;

wherein the axes of said first and second cone members are not parallel when the force applied to said crank deviates from said first predetermined force.

2. The constant torque automatic transmission for a bicycle of claim 1, further comprising:

a second yoke extending from said drive base for rotatably retaining said second cone member.

3. The constant torque automatic transmission for a bicycle of claim 1, further comprising:

said cone drive member being a belt.

4. The constant torque automatic transmission for a bicycle of claim 1, further comprising:

said second cone yoke being biased to force said first and second cone yokes apart to maintain tension on said cone drive member while keeping said first and second cone yokes substantially parallel to each other.

5. The constant torque automatic transmission for a bicycle of claim 4, further comprising:

a first sprocket being mounted to an end of said first cone member, the first sprocket being driven through a first chain.

6. The constant torque automatic transmission for a bicycle of claim 4, further comprising:

a second sprocket being mounted to an end of said second cone member, a rear drive member being mounted to a rear wheel of the bicycle, the rear drive member being driven by the second sprocket through a second chain.

* * * * *